March 26, 1968

N. W. HARRIS 3,375,475

TRAVELLING WAVE TUBES AND WAVE TRANSMISSION LINES
SUITABLE FOR USE THEREIN
Filed March 18, 1964

INVENTOR
Neville Wreford Harris
BY
Baldwin & Wight
ATTORNEYS

United States Patent Office 3,375,475
Patented Mar. 26, 1968

3,375,475
TRAVELLING WAVE TUBES AND WAVE
TRANSMISSION LINES SUITABLE FOR
USE THEREIN
Neville Wreford Harris, Great Baddow, Essex, England,
assignor to English Electric Valve Company Limited,
London, England, a British company
Filed Mar. 18, 1964, Ser. No. 352,914
Claims priority, application Great Britain, Mar. 25, 1963,
11,667/63
6 Claims. (Cl. 333—31)

ABSTRACT OF THE DISCLOSURE

A wave retarding structure for a travelling wave tube having slot-coupled resonant wave guide sections constituted by relatively thick members and thin partition walls alternating in a stack. The thick members have equally circumferentially spaced inwardly projecting fingers and the partition walls have equally circumferentially spaced radial slots. Successive thick members are staggered circumferentially so that the inwardly projecting fingers of a thick member are opposite the space between two adjacent fingers in the next thick member, and successive partition walls are so staggered circumferentially that each slot in a partition wall is opposite the unslotted material between two adjacent slots in the next partition wall.

Figure 1:
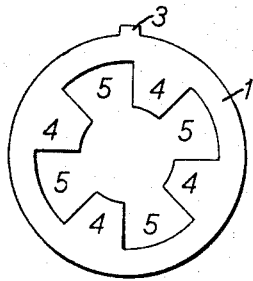

This invention relates to wave transmission lines and is primarily, though not exclusively, intended for the wave transmission lines of travelling wave tubes.

As is well known, travelling wave tubes, whether of the forward or backward wave type, have wave transmission lines for bringing the velocity of wave propagation in the line into the desired relation with the electron velocity in the electron beam of the tube in the manner necessary to obtain inter-action between the wave and the beam. There are many different forms of wave retarding transmission lines used in travelling wave tubes. In some the transmission line is a helix. In others it is a sectionalised, periodically loaded wave guide filter. This latter form of line has advantages over the helix type in the way of better heat dissipation and therefore enhanced power-handling capacity and better uniformity, from tube to tube, in mass production manufacture. This form of line is a band-pass wave retarding structure which is excited by radio frequency energy of a frequency within the pass band and consists of a series of what are, in effect, resonant wave guide sections or cavities coupled to one another to form an iterative structure. The resonant frequencies of the individual sections may be all the same or there may be several frequencies, for example, three, at which different sections are resonant, with a number of sections resonant each frequency and the frequencies at which successive sections are resonant being repeated cyclically along the line in some pre-determined manner, for example, $f_1$, $f_2$, $f_3$, $f_1$, $f_2$, $f_3$ . . . and so on, where $f_1$, $f_2$ and $f_3$ are three different frequencies all within the pass band and which are selected for section resonance. The sections are divided from one another by partition walls each common to two successive sections and coupling between successive sections is obtained by inductive slots in the partition walls. The construction consists of a stack of more or less thick members, the thickness of each defining the length of one section of the line, alternating with thin members each of which constitutes a partition wall between two adjacent sections. The partition wall members have each a central hole and a number of radial slots and the thick members have radially inward projecting fingers or indents. This type of line is commonly known as, and will be herein referred to as, the "clover leaf" type of transmission line. In a clover leaf type of line as at present known the stack of members is assembled in such manner and the slots, holes and fingers are so arranged that each finger of any one thick member is opposite the space between two fingers of the next thick member and is also opposite the solid unslotted material between two adjacent radial slots in all the partition walls being aligned in the axial direction so that, if one looks at an assembled stack in the longitudinal direction (i.e. in a direction parallel to the axis) one can see right through the stack through the aligned central holes and also through the aligned radial slots.

Known transmission lines of the clover leaf type and as above described have been found satisfactory for travelling wave tubes for high voltage operation, i.e. in which the electron voltage in in-phase operation is, approximately 80 kv. or more but are by no means satisfactory for travelling wave tubes of relatively low voltage operation, becoming unsatisfactory for tubes in which the electron voltage in in-phase operation is only about 40 kv. or less. In such tubes, of course, the physical length of each section of the clover leaf line is reduced as compared with that what applies in the case of a comparable higher voltage tube and it is found that the frequency-phase shift characteristic in a known travelling wave tube clover leaf transmission line as above described becomes increasingly unsatisfactory in the case of tubes of lower and lower operating voltage. Research and experiment have shown that this is due to undesired inter-action between aligned partition wall slots in adjacent partition walls. The present invention seeks to overcome this defect and to provide improved band-pass iterative-structure transmission lines of the clover leaf type comprising slot-coupled resonant wave guide sections suitable for use in travelling wave tubes.

According to this invention a band-pass iterative-structure clover leaf transmission line suitable for use as the wave retarding structure of a travelling wave tube and having a succession of slot-coupled resonant wave guide sections comprises a plurality of such sections each separated from the next by a common partition wall having a plurality of coupling slots therein, the slots in the individual partition walls being so arranged and positioned that any slot in any one partition wall is, when viewed in the longitudinal direction, opposite the unslotted material between two adjacent slots in the next partition wall.

According to a feature of this invention a bandpass iterative-structure clover leaf transmission line suitable for use as the wave retarding structure of a travelling wave tube and having a succession of slot-coupled resonant wave guide sections comprises a stack composed of a plurality of similar relatively thick members each having equally circumferential spaced inwardly projecting fingers and a plurality of similar partition walls each having equally circumferentially spaced radial slots, the said thick members and the said partition wall members alternating in the stack, successive thick members being staggered circumferentially so that each finger in any one such member is opposite (when viewed in the longitudinal direction) the space between two adjacent fingers in the next and successive partition wall members being so staggered circumferentially so that each slot in any one such member is opposite the unslotted material between two adjacent slots in the next, each slot in any partition wall member being opposite the space between two adjacent fingers in any thick member.

Preferably each slot in any one partition wall member is (when viewed in the longitudinal direction) midway between two adjacent slots in the next partition member.

It will be appreciated that, because of the staggering, in accordance with this invention, of the partition walls of a clover leaf transmission line in order to bring the slots in successive partition walls out of longitudinal alignment, the number of slots in any one partition wall will be one half the number which would be employed in a comparable known transmission line with aligned partition wall slots.

A travelling wave tube in accordance with this invention includes a clover leaf transmission line as hereinbefore defined having aligned central holes in its partition walls for passing the electron beam of the tube, said line being positioned and arranged to act as the wave retarding structure of the tube.

Figure 6:
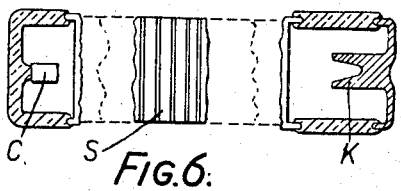
Figure 7:
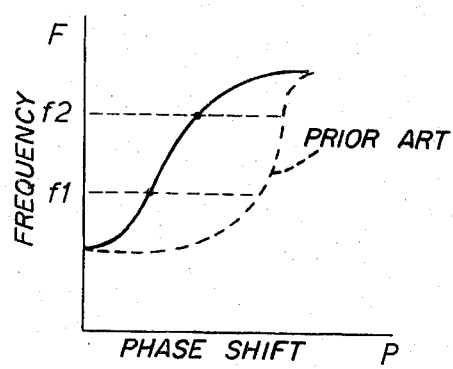

The invention is illustrated in the accompanying drawings, FIGS. 1 to 5 of which illustrate a preferred form of clover leaf transmission line in accordance with the invention; FIG. 6 shows the line of FIGS. 1 to 5 in a travelling wave tube; and FIG. 7 is an explanatory graphical figure.

Referring to FIGS. 1 to 5 these show, so far as is necessary to an understanding of the invention, clover leaf transmission line composed of a stack of similar relatively thick disc-like members 1, 1A alternating in the stack with similar thin partition-wall disc-like members 2, 2A. The members 1, 1A, 2, 2A—of which there would be a large number, though only two of each are shown—are all of the same external diameter and each has a small externally projecting similar lug 3 to facilitate their assembly in the stack in the correct positions rotationally. The only difference between members 1 and 1A similarly the only difference between members 2 and 2A lies in the position, circumferentially, of the lug 3. The members are stacked with the lugs 3 all aligned. Each member 1 or 1A has similar radially inwardly projecting fingers 4 (in the case illustrated, four fingers) equally circumferentially spaced and separated by spaces 5 of similar but inverted shape to the fingers and of the same arcuate extent. The lug 3 of member 1 is radially opposite one radial edge (the anti-clockwise edge, say) of a finger while the lug 3 of member 1A is radially opposite the other radial edge (the clockwise edge, say) of a finger. Each member 2 or 2A has a central hole 6 and four equally circumferentially spaced similar radial slots 7. The lug 3 of member 2 is circumferentially midway between the two adjacent slots but the corresponding lug 3 of member 2A is radially in line with one slot.

Figure 5:
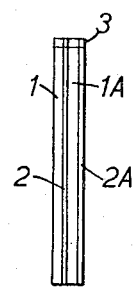

When these members are stacked as represented in FIG. 5 with the lugs 3 aligned and each partition memzer between two of the other members, it will be seen that the slots 7 in successive partition members will be at 45° to one another, the fingers 4 of any member 1 or 1A will be opposite the spaces 5 of the next member 1A or 1, and that no slot 7 will, when viewed longitudinally, be "covered" by any finger 4 in the stack.

FIG. 6 is a schematic representation, shown broken away, of a travelling wave tube in accordance with the invention. The stacked retardation line is as in FIGS. 1 to 5 and is referenced generally by the letter S. C represents the electron gun and K the collector. Details of the tubes are not shown, neither are the external sources of the customary magnetic fields. These are all as known.

Figure 2:
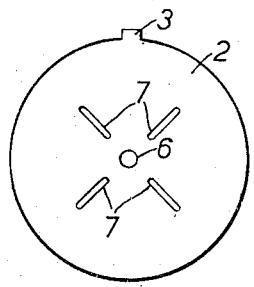
Figure 3:
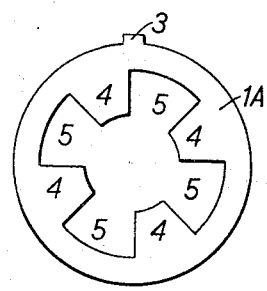
Figure 4:
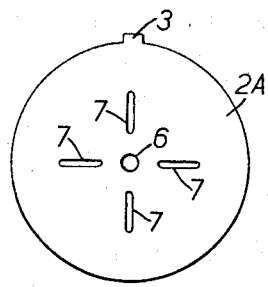

FIG. 7 illustrates graphically the nature of the improvement obtainable in a relatively low voltage tube in accordance with this invention as compared with a comparable tube having a known transmission line with aligned slots in its partition walls. The curves of FIG. 7 connect frequency F with phase shift P per section of the transmission line, the full line curve being for a transmission line, designed for a relatively low voltage tube, in accordance with this invention and the broken line curve being for an otherwise similar transmission line as known per se with aligned slots in its partition walls and, of course, with eight equally circumferentially spaced radial slots in each partition wall instead of the four shown in the walls 2 and 2A (FIGS. 2 and 4). The useful working frequency range is between $f_1$ and $f_2$. As will be seen the full line curve between $f_1$ and $f_2$ is substantially more linear than that of the broken line curve between the same frequencies. The reduction by this invention of undesired inter-action between the slots in successive partition walls thus gives substantially improved results and, in particular, broader band operation.

I claim:

1. A band-pass iterative-structure clover leaf transmission line suitable for use as the wave retarding structure of a travelling wave tube and having a succession of slot-coupled resonant wave guide sections arranged along an axis of the transmission line, said transmission line comprising a plurality of such sections each separated from the next by a common partition wall substantially fully closing each of said wave guide sections adjacent thereto and having a plurality of narrow, elongate coupling slots therein, the slots in the individual partition walls being so arranged and positioned that any slot in any one partition wall, is, when viewed along the axis of the tube, opposite the unslotted material between two adjacent slots in the next partition wall whereby said slots provide coupling between adjacent wave guide sections while precluding coupling between non-adjacent wave guide sections.

2. A band-pass iterative-structure clover leaf transmission line suitable for use as the wave retarding structure of a travelling wave tube and having a succession of slot-coupled resonant wave guide sections arranged along an axis of the transmission line, said transmission line comprising a stack composed of a plurality of similar relatively thick members each having equally circumferentially spaced inwardly projecting fingers and a plurality of similar partition walls each having equally circumferentially spaced radial slots, the said thick members and the said partition wall members alternating in the stack, successive thick members being staggered circumferentially so that each finger in any one such member is opposite, when viewed along the axis of the tube, the space between two adjacent fingers in the next thick member and successive partition wall members being staggered circumferentially so that each slot in any one such member is opposite the unslotted material between two adjacent slots in the next partition wall member, each slot in any partition wall member being opposite the space between two adjacent fingers in any thick member.

3. A transmission line as claimed in claim 2 wherein each slot in any one partition wall member is, when viewed along the axis of the tube, midway between two adjacent slots in the next partition member.

4. A travelling wave tube having a wave retarding transmission line as claimed in claim 3 and inserted in aligned central holes provided in the partition walls of said line.

5. A band-pass iterative-structure clover leaf transmission line suitable for use as a wave retarding structure of a travelling wave tube and having a succession of slot-coupled resonant wave guide sections, said transmission line comprising a plurality of members having openings formed therethrough, said openings defining said wave guide sections and being angularly staggered with respect to the openings in adjacent members, a plurality of partition walls intermediate adjacent sections of said succession of wave guide sections, said partitions having coupling slots formed therein, said slots in each partition wall defining an unslotted section of said wall therebetween, said slots in each partition wall being aligned with said unslotted section of the nearest of said partition walls on at least one side thereof and being in coupling communication between angularly staggered openings of adjacent wave guide sections.

6. A band-pass iterative-structure clover leaf transmission line for use as a wave retarding structure of a travelling wave tube and having a succession of slot-coupled wave guide sections, said transmission line comprising a series of alternatively stacked wave-guide members and partition walls, said wave-guide members having a plurality of radially inwardly directed fingers defining spaces therebetween, said spaces comprising said wave-guide sections, said fingers of each wave-guide member being aligned with said spaces of an adjacent wave-guide member, said partition walls having coupling slots formed therein and defining unslotted wall sections therebetween, said slots being aligned with said spaces of adjacent wave-guide members and said slots in each partition wall being aligned with said unslotted sections of the next partition wall.

References Cited

UNITED STATES PATENTS 3,233,139   2/1966   Chodorow _____ 315—3.5

FOREIGN PATENTS 880,197   10/1961   Great Britain.

ELI LIEBERMAN, *Primary Examiner.*

HERMAN K. SAALBACH, *Examiner.*

P. L. GENSLER, *Assistant Examiner.*